US007431317B2

(12) United States Patent
Wu

(10) Patent No.: US 7,431,317 B2
(45) Date of Patent: Oct. 7, 2008

(54) BICYCLE FRAME PART HAVING A DISPROPORTIONALLY ENLARGED END SECTION AND PROCESS FOR MAKING THE SAME

(75) Inventor: K. U. Wu, Taichung Hsien (TW)

(73) Assignee: Giant Manufacturing Co., Ltd. (TW)

( * ) Notice: Subject to any disclaimer, the term of this patent is extended or adjusted under 35 U.S.C. 154(b) by 0 days.

(21) Appl. No.: 11/527,753

(22) Filed: Sep. 25, 2006

(65) Prior Publication Data

US 2007/0063477 A1 Mar. 22, 2007

Related U.S. Application Data

(63) Continuation of application No. 10/756,367, filed on Jan. 14, 2004, now Pat. No. 7,140,226, which is a continuation-in-part of application No. 10/211,550, filed on Aug. 5, 2002, now abandoned.

(51) Int. Cl.
*B62K 19/06* (2006.01)

(52) U.S. Cl. .................... 280/281.1; 280/798; 280/274; 428/586; 428/600

(58) Field of Classification Search ....................... None
See application file for complete search history.

(56) References Cited

U.S. PATENT DOCUMENTS 2,196,497 A * 4/1940 Heman ........................ 228/151
2,192,560 A * 9/1940 Riemenschneider ........ 280/796
2,431,851 A 12/1947 Warden
2,506,657 A * 5/1950 Webster ......................... 72/68
2,739,376 A 3/1956 Peet
3,452,576 A 7/1969 Wilson
4,277,969 A * 7/1981 Simon ......................... 72/266
4,428,900 A * 1/1984 Riley et al. ................. 264/526
4,484,756 A * 11/1984 Takamiya et al. ........ 280/281.1
4,616,500 A * 10/1986 Alexoff ....................... 72/283
4,769,897 A * 9/1988 Moseman .................... 29/525
5,333,775 A * 8/1994 Bruggemann et al. ....... 228/157
5,507,888 A * 4/1996 Dickson et al. ............. 148/690
5,671,626 A 9/1997 Lonbani
5,832,766 A 11/1998 Hartman et al.
5,832,785 A * 11/1998 Costahaude et al. ........ 74/551.1
6,241,310 B1 * 6/2001 Patelczyk ................... 296/205
6,453,714 B2 9/2002 Kido et al.
6,581,433 B2 6/2003 Otsuka et al.
6,826,943 B2 12/2004 Rempe et al.
6,845,552 B2 1/2005 Blough
2002/0043089 A1 4/2002 Reiche et al.

FOREIGN PATENT DOCUMENTS

JP 54-52664 4/1979

* cited by examiner

*Primary Examiner*—John J Zimmerman
(74) *Attorney, Agent, or Firm*—Finnegan, Henderson, Farabow, Garrett & Dunner, LLP

(57) ABSTRACT

A bicycle frame part having a disproportionally enlarged end section and a method for making the same. The tube may be used as a bicycle frame part, and it may include a first section having a thickness, a second section configured to be forged from a first shape having a thickness that is different from the thickness of the first section to a second shape having a thickness that is less than the thickness of the first shape. The second shape of the second section may be proportionally enlarged relative to the first shape of the second section.

7 Claims, 9 Drawing Sheets

BICYCLE FRAME PART HAVING A DISPROPORTIONALLY ENLARGED END SECTION AND PROCESS FOR MAKING THE SAME

CROSS-REFERENCE TO RELATED APPLICATION

This application is a continuation of U.S. patent application Ser. No. 10/756,367, now issued as U.S. Pat. No. 7,140, 226, filed on Jan. 14, 2004, which is a continuation-in-part (CIP) of U.S. patent application Ser. No. 10/211,550, filed by the applicant on Aug. 5, 2002 now abandoned, the entire disclosure of which is incorporated herein by reference.

BACKGROUND OF THE INVENTION

1. Field of the Invention

This invention relates to a multi-stage tube forging method for disproportionally enlarging an end section of an aluminum alloy tube of a bicycle frame part.

2. Description of the Related Art

FIG. 1 illustrates a conventional method of forming a bicycle tube that includes the steps of cutting a hollow rigid tube 1 having a predetermined length, and placing the tube 1 thus cut in a tube forming machine. During the tube forming operation, the middle section of the tube 1 is clamped by a positioning clamp seat 11 of the tube forming machine, with a pair of mandrels 13 inserted respectively and movably into two opposite ends of the tube 1 and a pair of mold components 12 sleeved respectively and movably on the ends of the tube 1. The inner diameter and wall thickness of the tube 1 are changed along the length of the tube 1 as a result of the movement of the mold components 12 and the pair of mandrels 13.

U.S. Pat. No. 6,453,714 describes a method for forming an eccentrically expanded pipe that includes the steps of coaxially expanding a portion of a base pipe 2 at least one time by using a first expander punch (not shown) to form an expanded portion 21, an intermediate tapering portion 22 and a neck portion 23, and as shown in FIG. 2, decentering the expanded portion 21 and the neck portion 23 relative to one another by using a second expander punch 24 having a diameter larger than that of the first expander punch.

The abovementioned conventional methods are disadvantageous in that the body of either the tube 1 or the base pipe 2 is subjected to a relatively large internal stress therein. In addition, if the tube 1 or the base pipe 2 is made from aluminum alloy, the same tends to break during the enlarging operation.

SUMMARY OF THE INVENTION

Therefore, the object of the present invention is to provide a multi-stage tube forging method for disproportionally enlarging an end section of an aluminum alloy tube that is capable of overcoming the aforesaid problems associated with the prior art.

According to the present invention, the multi-stage tube forging method for disproportionally enlarging an end section of an aluminum alloy tube comprises the steps of: (a) drawing the aluminum alloy tube to form a thin section and a thick end section extending from the thin section, wherein the thin section has a wall thickness thinner than that of the thick end section; (b) radially and proportionally enlarging the cross-section of the thick end section of the aluminum alloy tube by forging the aluminum alloy tube in a first die using a first mandrel in such a manner that the wall thickness of the thick end section after being enlarged is substantially the same as that of the thin section; and (c) disproportionally varying the cross-section of the thick end section of the aluminum alloy tube by forging the aluminum alloy tube obtained in step (b) in a second die using a second mandrel.

Preferably, the perimeter of an end edge of the thick end section of the aluminum alloy tube obtained after step (c) is substantially equal to that of the end edge of the thick end section of the aluminum alloy tube obtained after step (b) and before step (c).

BRIEF DESCRIPTION OF THE DRAWINGS

In the drawings which illustrate an embodiment of the invention.

DETAILED DESCRIPTION OF THE PREFERRED EMBODIMENT

Figure 1:
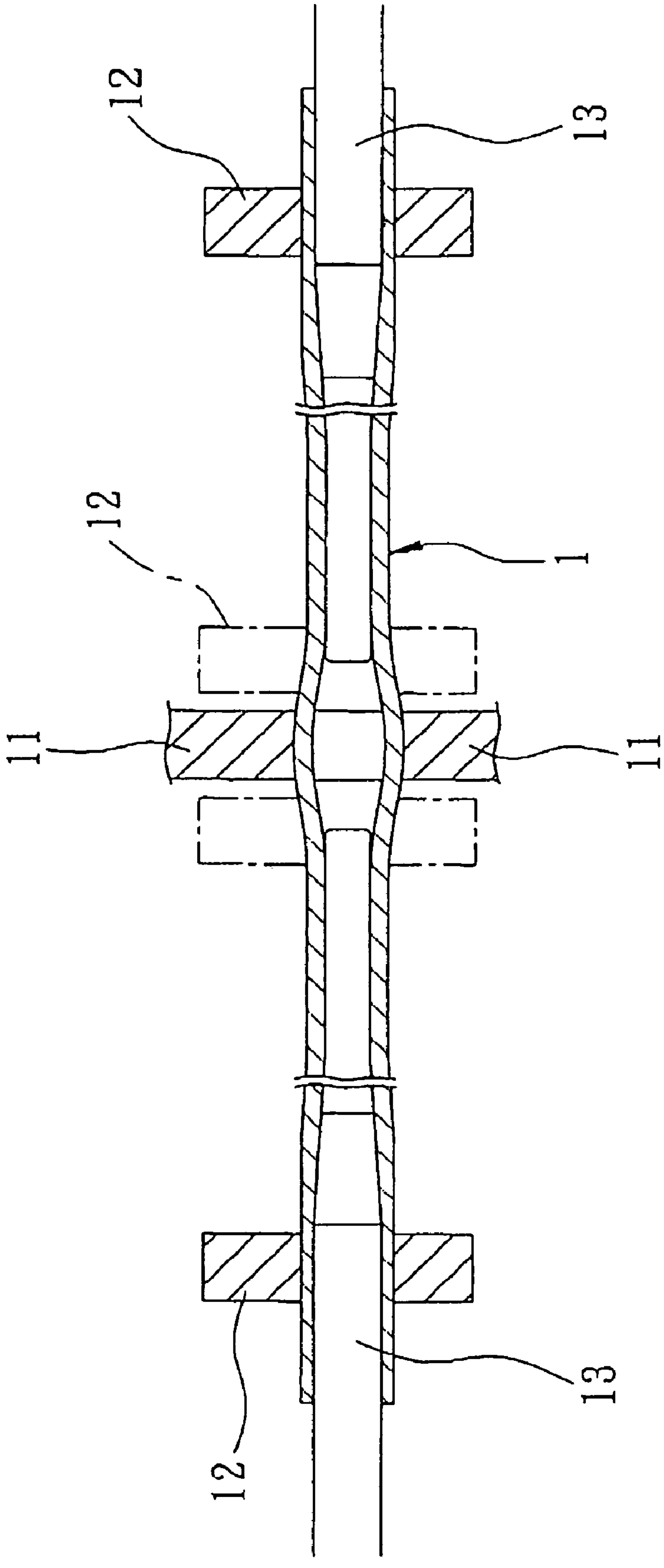
FIG. 1 illustrates a conventional method of forming a bicycle tube.
Figure 2:
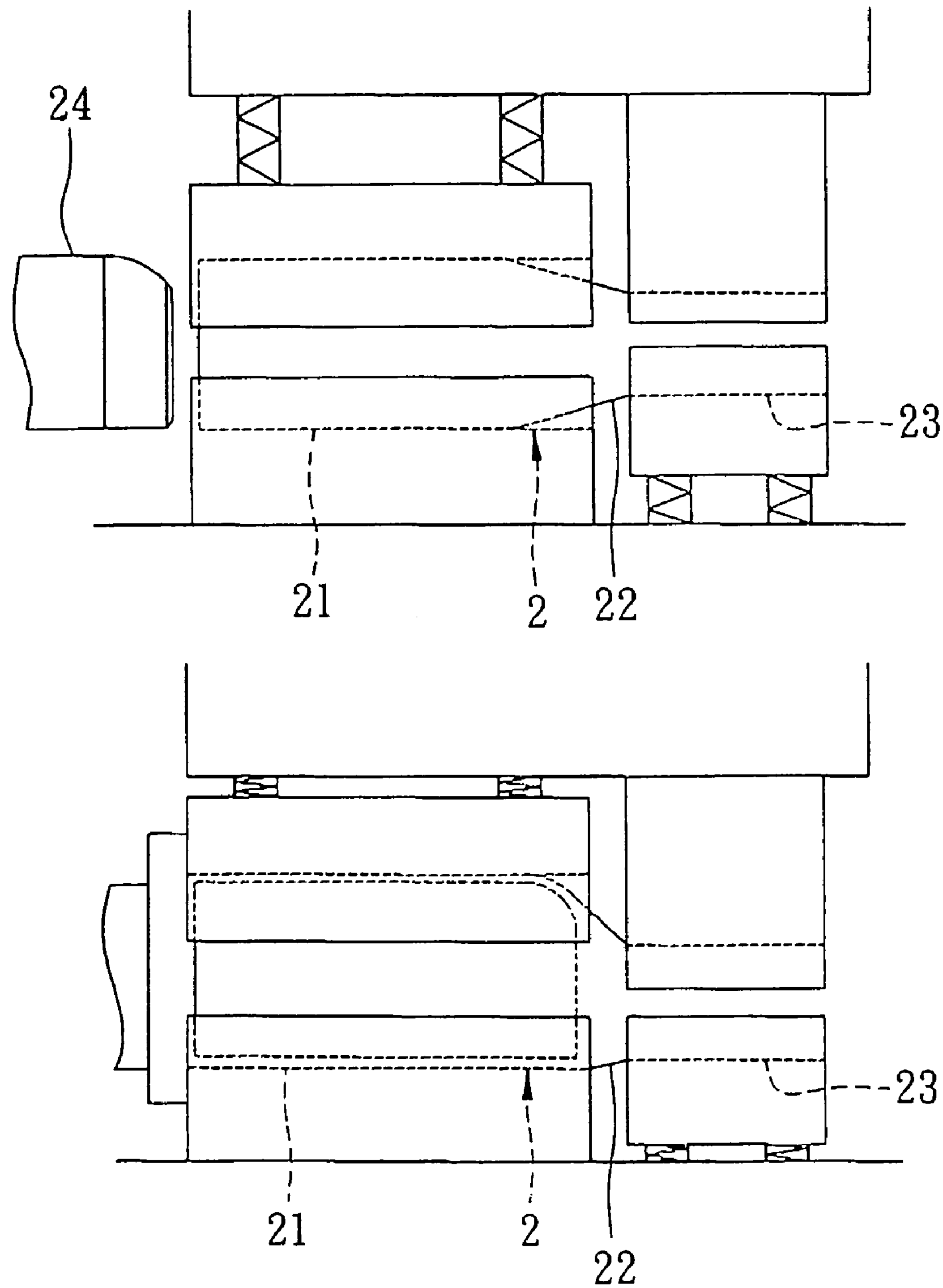
FIG. 2 illustrates an eccentrically expanding operation of a conventional method for forming an eccentrically expanded pipe.
Figure 3:
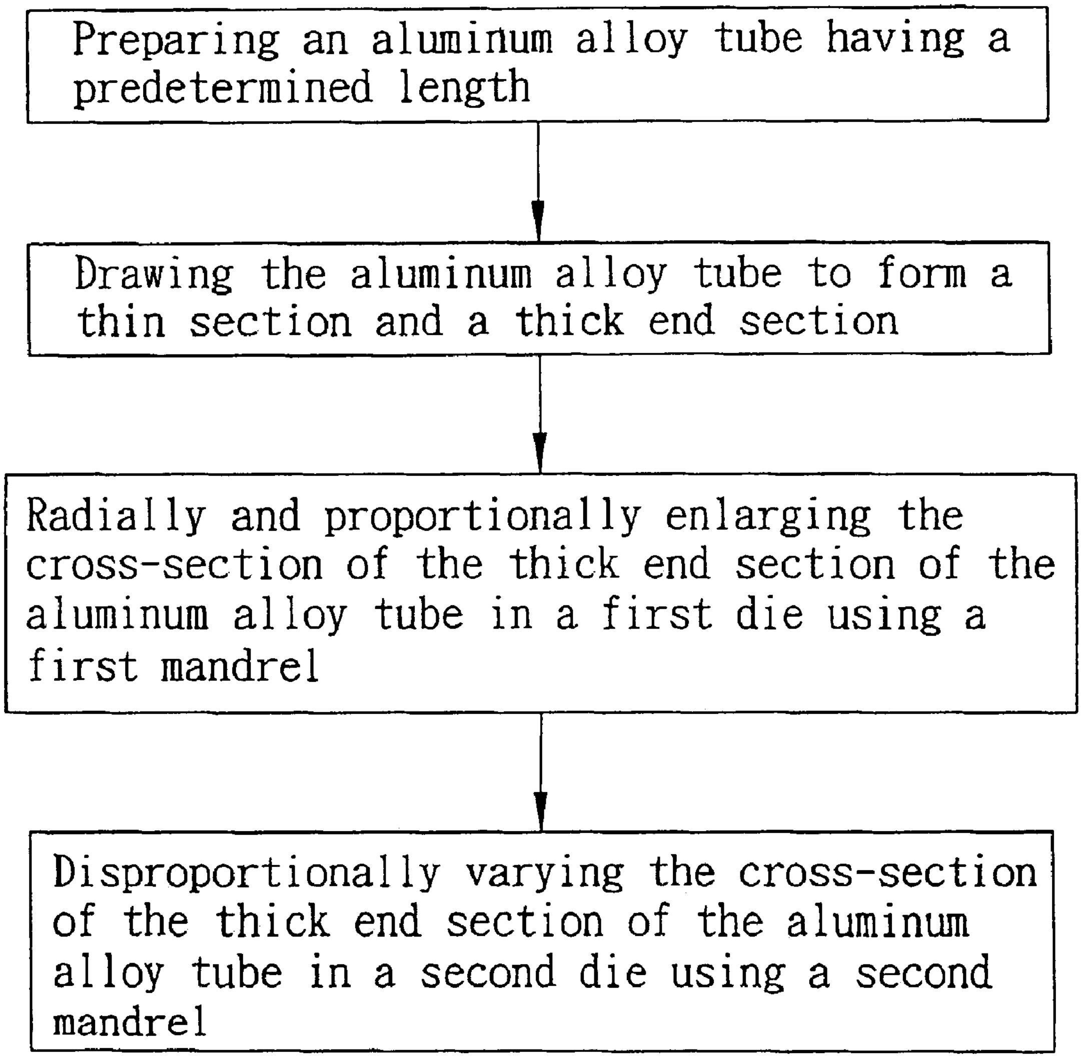
FIG. 3 is a block diagram illustrating consecutive steps of the preferred embodiment of a multi-stage forging method of this invention for disproportionally enlarging an end section of an aluminum alloy tube of a bicycle frame part.
Figure 4:
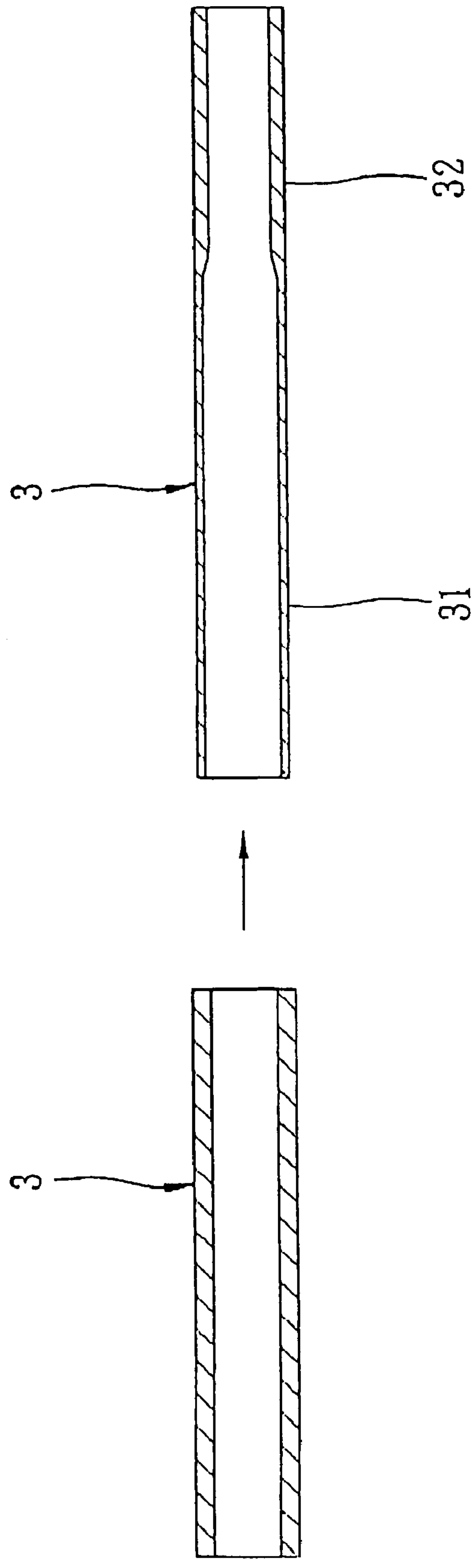
FIG. 4 is a schematic cross-sectional view to illustrate how the aluminum alloy tube is drawn to form a thin section and a thick end section in the preferred embodiment of the present invention.
Figure 5:
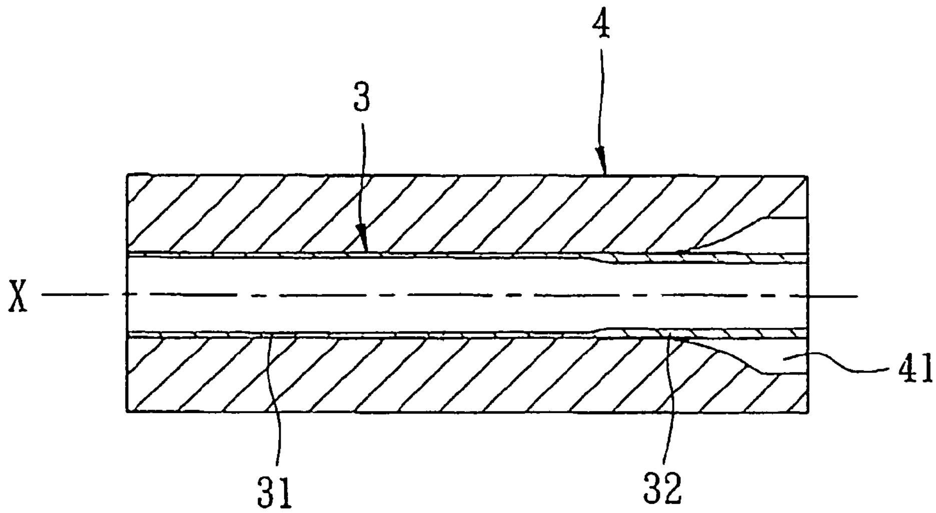
FIG. 5 is a schematic cross-sectional view to illustrate how the aluminum alloy tube is inserted into a first die in the preferred embodiment of the present invention.
Figure 6:
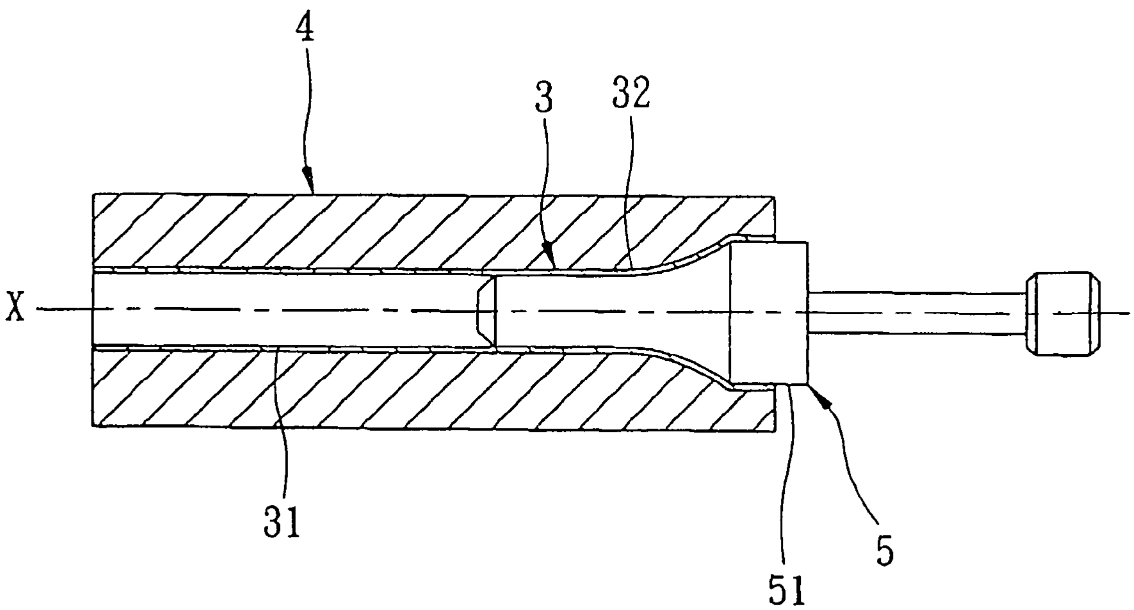
FIG. 6 is a schematic cross-sectional view to illustrate how the aluminum alloy tube is forged through a first mandrel in the preferred embodiment of the present invention.
Figure 7:
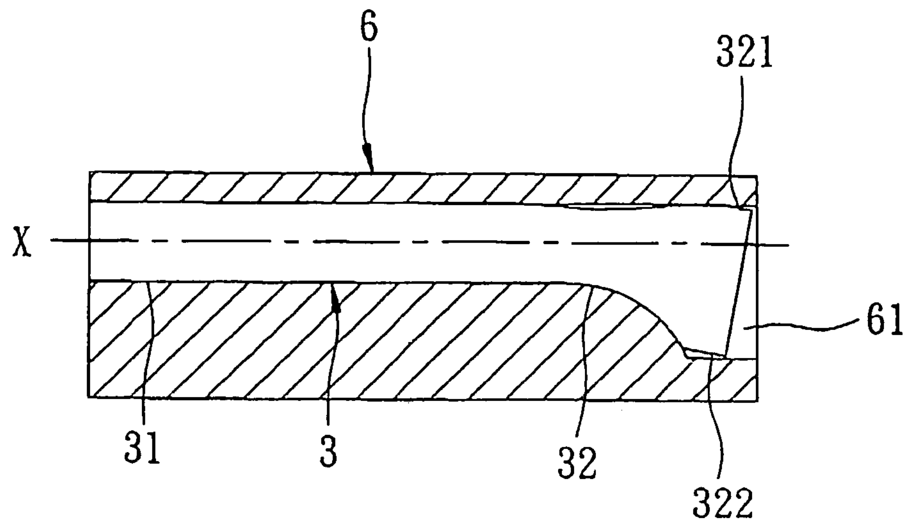
FIG. 7 is a schematic cross-sectional view to illustrate how the aluminum alloy tube of FIG. 6 is inserted into a second die.
Figure 8:
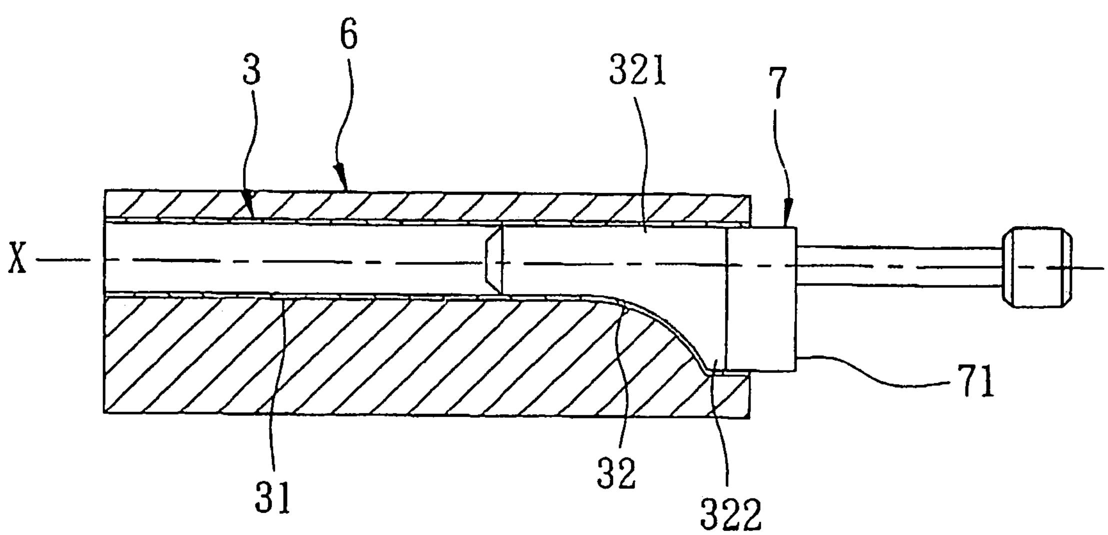
FIG. 8 is a schematic cross-sectional view to illustrate how the aluminum alloy tube of FIG. 7 is subjected to a second forging operation through a second mandrel.
Figure 9:
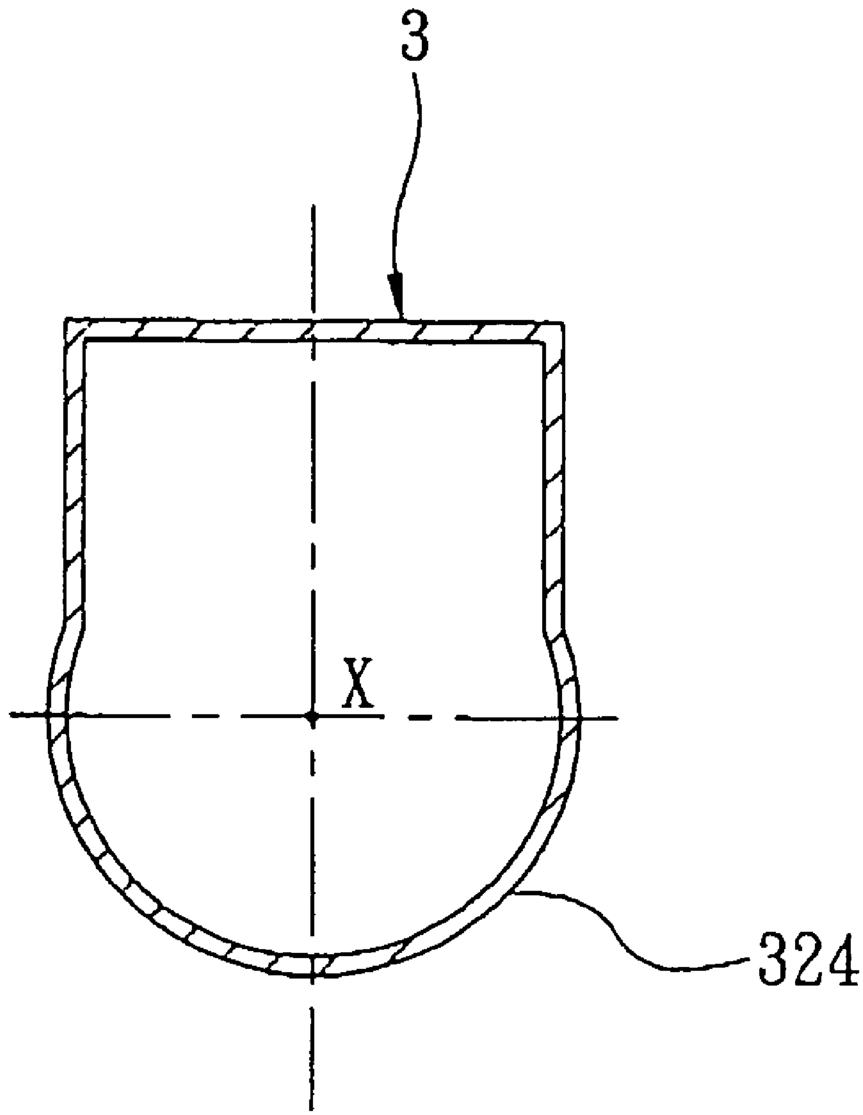
FIG. 9 is a cross-sectional view of the thick end section of the aluminum alloy tube resulting form the forging operation shown in FIG. 8.

FIGS. 3 to 9 illustrate consecutive steps of a preferred embodiment of a multi-stage forging method of this invention for disproportionally enlarging an end section of an aluminum alloy tube 3 of a bicycle frame part (see FIG. 9). The method includes the steps of: (a) preparing the aluminum alloy tube 3 having a predetermined length, first and second dies 4, 6 with end sections that respectively define first and second shape-forming cavities 41, 61, and first and second mandrels 5, 7 with shape-forming ends 51, 71 that have cross-sections respectively corresponding to those of the end sections of the first and second dies 4, 6 (see FIGS. 6 and 8); (b) drawing the aluminum alloy tube 3 to form a thin section 31 and a thick end section 32 extending from the thin section 31, wherein the thin section 31 has a wall thickness thinner than that of the thick end section 32 (see FIG. 4); (c) inserting the thin section 31 of the aluminum alloy tube 3 into the first shape-forming cavity 41 in the first die 4, as illustrated in FIG. 5; (d) radially and proportionally enlarging the cross-section of the thick end section 32 of the aluminum alloy tube 3 relative to a centerline (X) of the aluminum alloy tube 3 by forging the aluminum alloy tube 3 in the first shape-forming cavity 41 with the shape-forming end 51 of the first mandrel 5 inserted into the thick end section 32 of the aluminum alloy tube 3 in such a manner that the wall thickness of the thick end section 32 after being enlarged is substantially the same as that of the thin section 31, as best illustrated in FIG. 6; and (e) disproportionally varying the cross-section of the thick end section 32 of the aluminum alloy tube 3 by forging the aluminum alloy tube 3 obtained in step (d) in the second shape-forming cavity 61 with the shape-forming end 71 of the second mandrel 7 inserted into the thick end section 32 of the aluminum alloy tube 3, as illustrated in FIGS. 7 to 9. The thick end section 32 of the aluminum alloy tube 3 is forged in step (e) in such a manner that a portion 321 of the cross-section of the thick end section 32 of the aluminum alloy tube 3 is reduced and the remaining portion 322 of the cross-section of the thick end section 32 of the aluminum alloy tube 3 is further enlarged (see FIG. 7), and that the perimeter of an end edge 324 of the end section 32 of the aluminum alloy tube 3 obtained after step (e) (see FIG. 9) is substantially equal to that of the end edge 324 of the thick end section 32 of the aluminum alloy tube 3 obtained after step (d) and before step (e).

Figure 10:
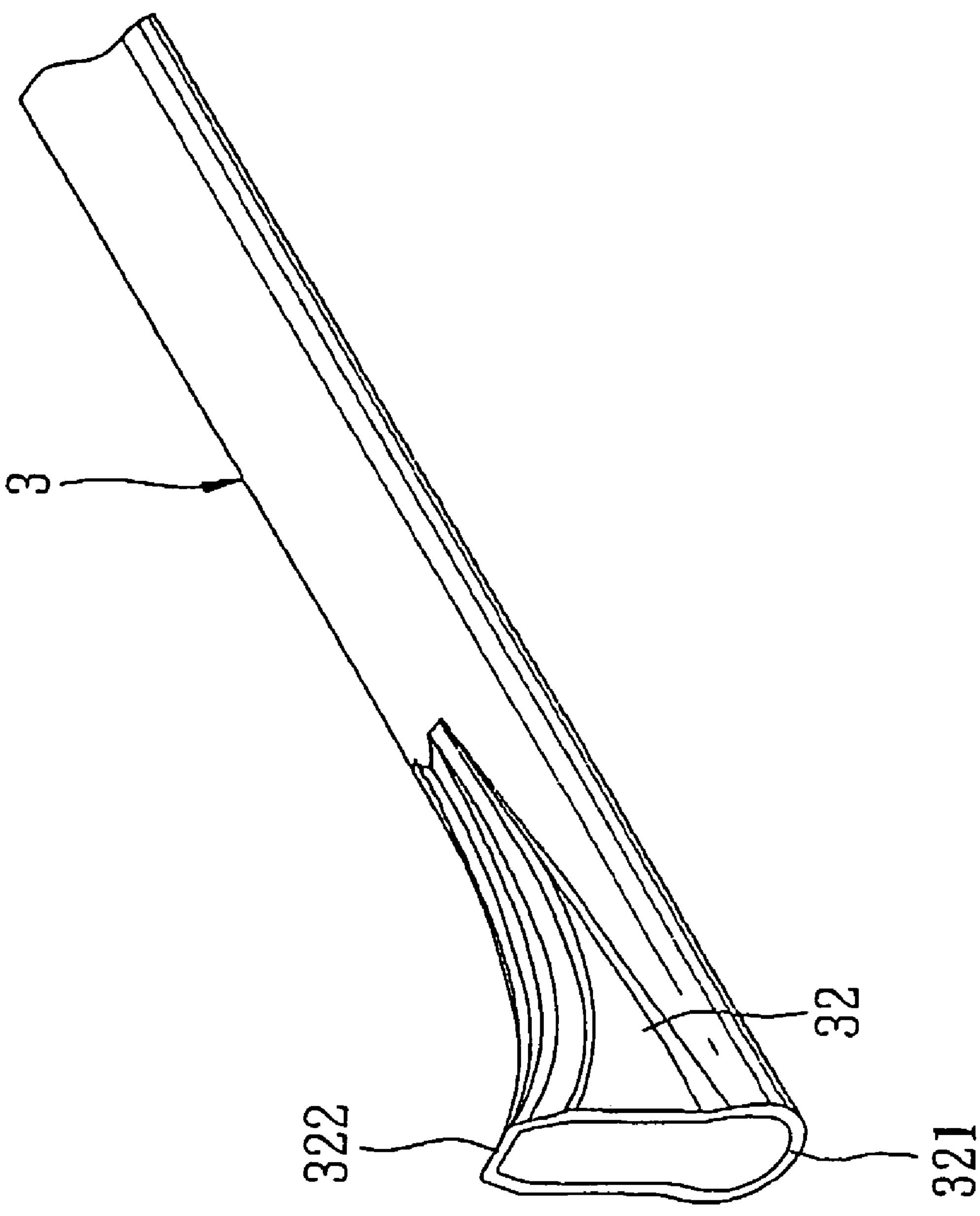
FIGS. 10 and 11 are perspective views to illustrate various shapes of the thick end section of the aluminum alloy tube that can be formed according to the method of this invention.
Figure 11:
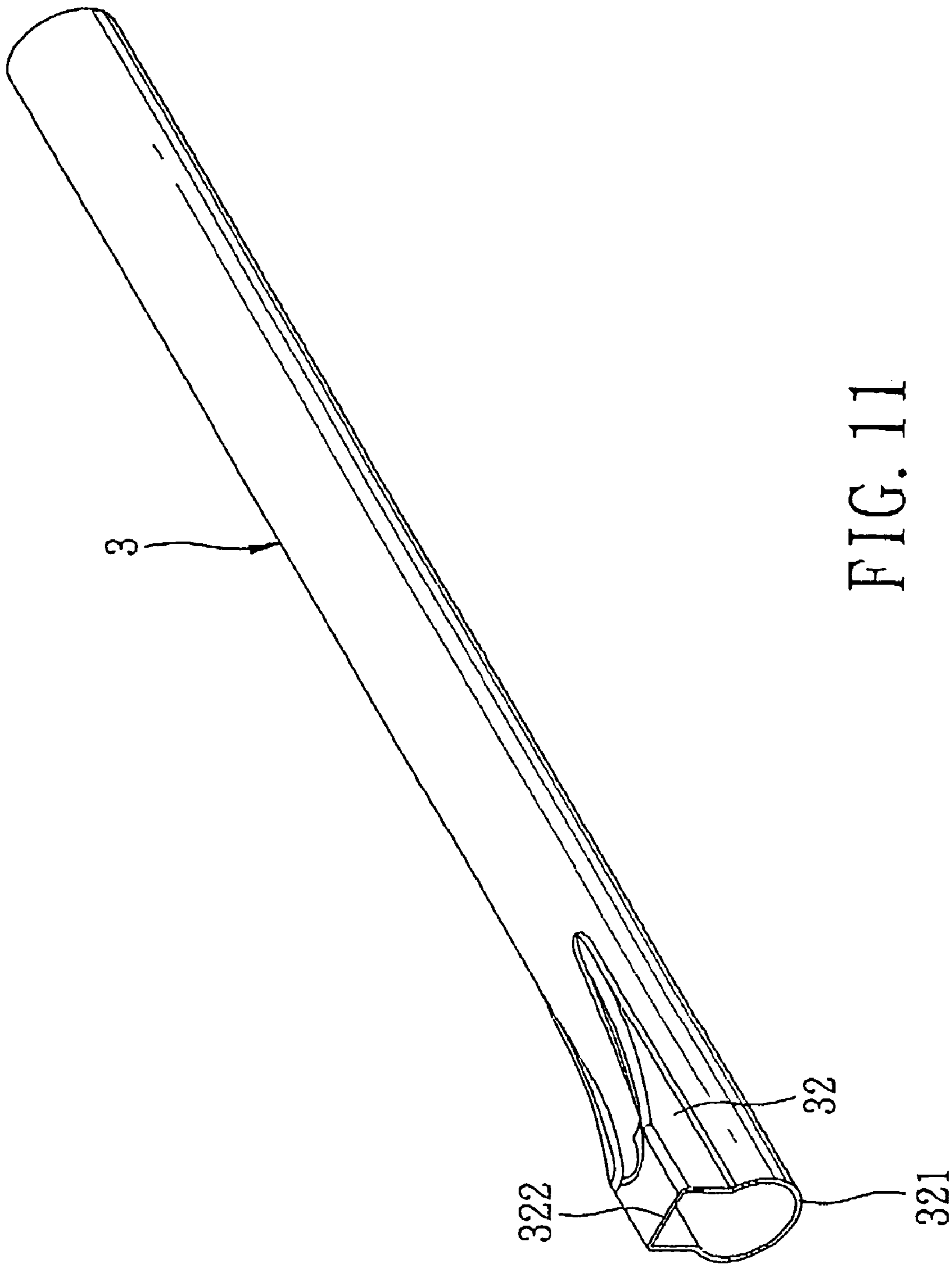

FIGS. 10 and 11 respectively illustrate various shapes of the thick end section 32 of the aluminum alloy tube 3 of a bicycle frame part that can be formed according to the method of this invention.

Preferably, in this embodiment, the aluminum alloy tube 3 is cleaned and subsequently immersed in a lubricant medium before the drawing operation of step (b).

In addition, if the aluminum alloy tube 3 is hardened before the drawing operation, the aluminum alloy tube 3 may be partially annealed prior to the drawing operation of step (b). More preferably, the partial annealing operation is conducted at a temperature ranging from 350° C. to 380° C. for 2 to 3 hours. Most preferably, the partial annealing operation is conducted at a temperature of 355° C. for 2.5 hours.

Preferably, in this embodiment, the aluminum alloy tube 3 is completely annealed prior to the insertion of the aluminum alloy tube 3 into the first die 4 in step (c). More preferably, the complete annealing operation is conducted at a temperature ranging from 400° C. to 420° C. for 2 to 3 hours. Most preferably, the complete annealing operation is conducted at a temperature of 410° C. for 2.5 hours. Additionally, before the complete annealing operation, the aluminum alloy tube 3 is cleaned by using a detergent to remove the lubricant coated on the aluminum alloy tube 3, By virtue of the drawing operation and the complete annealing operation before conduction of the enlarging operation, the aforesaid drawbacks as encountered in the prior art can be eliminated. In addition, the thick end section 32 of the aluminum alloy tube 3, which is disproportionally enlarged according to the method of this invention, possesses a surface texture with regularly and gradually developed wrinkles that enhance the appearance of the aluminum alloy tube 3.

With the invention thus explained, it is apparent that various modifications and variations can be made without departing from the spirit of the present invention. It is therefore intended that the invention be limited only as recited in the appended claims.

I claim:

1. A bicycle frame tube made by a method comprising the steps of:

drawing a tube having a first section with a first wall thickness connected to a second section with a second wall thickness that is different from the first wall thickness, the second section ending in an opening;

radially and proportionally enlarging a cross-section of the second section of the tube, by forging the tube into a first shape, wherein the second section has a third wall thickness that is substantially equal to the first wall thickness of the first section; and disproportionally varying the cross-section of the second section by forging the first shape of the second section of the tube into a second shape, wherein a first end portion of the second section at the opening is disproportionally varied relative to a second end portion of the second section at the opening, and wherein a width of a cross-section of the second end portion at the opening is greater than a width of a cross-section of the first end portion at the opening.

2. The bicycle frame tube of claim 1, wherein the step of drawing includes shaping an aluminum alloy material.

3. The bicycle frame tube of claim 1, wherein the step of drawing includes annealing of the tube.

4. The bicycle frame tube of claim 1, wherein the step of deforming the first shape of the second section of the tube to a second shape at the opening includes forging the first end portion into a substantially rectangular shape and forging the second end portion into a substantially circular shape at the opening.

5. The bicycle frame tube of claim 1, further comprising a step of forming a surface texture having at least one wrinkle on the second shape of the second section of the tube.

6. The bicycle frame tube of claim 1, further comprising a step of inserting the tube into a first shape-forming cavity in a first die.

7. The bicycle frame tube of claim 6, further comprising a step of inserting the tube into a second shape-forming cavity in a second die.

* * * * *